United States Patent
Weaver et al.

(10) Patent No.: US 9,822,016 B2
(45) Date of Patent: Nov. 21, 2017

(54) RECYCLE OF TITANIUM DIBORIDE MATERIALS

(71) Applicant: ALCOA INC., Pittsburgh, PA (US)

(72) Inventors: Mark L. Weaver, Greenwell Springs, LA (US); Andrew L. Schnitgen, Mars, PA (US); Robert A. DiMilia, Greensburg, PA (US); Frankie A. Phelps, Apollo, PA (US); James C. McMillen, Pittsburgh, PA (US)

(73) Assignee: Alcoa USA Corp., Pittsburgh, PA (US)

( * ) Notice: Subject to any disclaimer, the term of this patent is extended or adjusted under 35 U.S.C. 154(b) by 54 days.

(21) Appl. No.: 14/932,573

(22) Filed: Nov. 4, 2015

(65) Prior Publication Data

US 2016/0052795 A1 Feb. 25, 2016

Related U.S. Application Data (63) Continuation of application No. 13/910,679, filed on Jun. 5, 2013, now Pat. No. 9,181,101.

(60) Provisional application No. 61/656,357, filed on Jun. 6, 2012, provisional application No. 61/698,897, filed on Sep. 10, 2012, provisional application No. 61/787,127, filed on Mar. 15, 2013.

(51) Int. Cl.
| | | |
|---|---|---|
| C01B 35/04 | (2006.01) | |
| C01G 23/02 | (2006.01) | |
| C01G 23/07 | (2006.01) | |
| C22B 34/12 | (2006.01) | |

(52) U.S. Cl.
CPC .............. *C01G 23/02* (2013.01); *C01B 35/04* (2013.01); *C01G 23/022* (2013.01); *C01G 23/07* (2013.01); *C22B 34/1222* (2013.01)

(58) Field of Classification Search
CPC ........................................................ C01B 35/04
USPC ........................................................ 423/492
See application file for complete search history.

(56) References Cited

U.S. PATENT DOCUMENTS

| | | | |
|---|---|---|---|
| 2,998,302 A * | 8/1961 | Mercuri | C01B 35/04 423/297 |
| 3,144,306 A | 8/1964 | May et al. | |
| 4,233,277 A | 11/1980 | Sheppard | |
| 4,266,977 A | 5/1981 | Steiger | |
| 4,452,767 A | 6/1984 | Brynestad et al. | |
| 4,854,972 A | 8/1989 | Garrido et al. | |
| 2011/0104033 A1* | 5/2011 | McMillen | C01B 35/04 423/297 |

FOREIGN PATENT DOCUMENTS

| RU | 2354503 C1 | 5/2009 |
|---|---|---|
| RU | 2009120321 | 12/2010 |

OTHER PUBLICATIONS

International Search Report and Written Opinion of the International Searching Authority from corresponding International Application No. PCT/US2013/044283.

(Continued)

*Primary Examiner* — Matthew E Hoban
*Assistant Examiner* — James Fiorito
(74) *Attorney, Agent, or Firm* — Greenberg Traurig, LLP (57) ABSTRACT

A method to recycle TiB2 articles, and in particular, a method to recycle a TiB2 feedstock including TiB2 articles and Ti-ore and/or Ti-slag by chlorination.

15 Claims, 8 Drawing Sheets

(56) References Cited

OTHER PUBLICATIONS

Doblin, Christian; Chryss, Andrew; Monch, Andreas, "Titanium Powder from the TiRo Process", Key Engineering Materials vol. 520 (2012), pp. 95-100.
Doblin, Christian; Taiwar Kapil; Wilkinson, Nola, "Making Titanium Metal Powder", www.csiro.au, Oct. 8, 2010.

\* cited by examiner

| T = 200.00 °C | | | |
|---|---|---|---|
| P = 1.00000E+00 atm | | | |
| V = 1.16477E+02 dm3 | | | |
| STREAM CONSTITUENTS | AMOUNT/mol | TEMPERATURE/°C | PRESSURE/atm |
| TiB2_solid(s) | 1.00E+00 | 1000 | 1.00E+00 |
| Cl2/gas_Ideal/ | 5.00E+00 | 1000 | 1.00E+00 |
| | EQUIL AMOUNT | MOLE FRACTION | FUGACITY |
| PHASE: gas_Ideal | mol | | atm |
| BCl3 | 2.00E+00 | 6.67E-01 | 6.67E-01 |
| TiCl4 | 1.00E+00 | 3.33E-01 | 3.33E-01 |
| TiCl3 | 2.13E-14 | 7.10E-15 | 7.10E-15 |
| Cl2 | 1.07E-14 | 3.55E-15 | 3.55E-15 |
| Ti2Cl6 | 8.27E-18 | 2.76E-18 | 2.76E-18 |
| Cl | 4.83E-18 | 1.61E-18 | 1.61E-18 |
| (BCl2)2 | 5.09E-21 | 1.70E-21 | 1.70E-21 |
| BCl2 | 5.39E-24 | 1.80E-24 | 1.80E-24 |
| TiCl2 | 1.03E-36 | 3.44E-37 | 3.44E-37 |
| BCl | 1.95E-38 | 6.50E-39 | 6.50E-39 |
| TiCl | 1.97E-68 | 6.57E-69 | 6.57E-69 |
| B | 1.08E-74 | 3.59E-75 | 3.59E-75 |
| TOTAL: | 3.00E+00 | 1.00E+00 | 1.00E+00 |
| | mol | | ACTIVITY |
| TiCl4_solid(s) | 0.00E+00 | | 6.52E-03 |
| TiCl3_solid(s) | 0.00E+00 | | 7.06E-04 |
| TiCl2_solid(s) | 0.00E+00 | | 2.22E-16 |
| B_solid_beta-rhomboh(s) | 0.00E+00 | | 4.34E-21 |
| Ti_solid_alpha(s) | 0.00E+00 | | 3.37E-50 |
| Ti_solid_beta(s2) | 0.00E+00 | | 1.40E-50 |
| TiB_solid(s) | 0.00E+00 | | 5.48E-53 |
| TiB2_solid(s) | 0.00E+00 | | 8.19E-61 |

FIG.4

| T = 500.00 °C | | | |
|---|---|---|---|
| P=1.00000E+00 atm | | | |
| V = 1.90329E+02 dm3 | | | |
| | | | |
| STREAM CONSTITUENTS | AMOUNT/mol | TEMPERATURE/°C | PRESSURE/atm |
| TiB2_solid(s) | 1.00E+00 | 1000 | 1.00E+00 |
| Cl2/gas_Ideal/ | 5.00E+00 | 1000 | 1.00E+00 |
| | | | |
| | EQUIL AMOUNT | MOLE FRACTION | FUGACITY |
| PHASE: gas_Ideal | mol | | atm |
| BCl3 | 2.00E+00 | 6.67E-01 | 6.67E-01 |
| TiCl4 | 1.00E+00 | 3.33E-01 | 3.33E-01 |
| TiCl3 | 4.91E-08 | 1.64E-08 | 1.64E-08 |
| Cl2 | 2.39E-08 | 7.97E-09 | 7.97E-09 |
| Cl | 1.31E-09 | 4.36E-10 | 4.36E-10 |
| Ti2Cl6 | 1.30E-12 | 4.32E-13 | 4.32E-13 |
| BCl2 | 2.54E-13 | 8.47E-14 | 8.47E-14 |
| (BCl2)2 | 9.19E-14 | 3.06E-14 | 3.06E-14 |
| TiCl2 | 1.30E-20 | 4.34E-21 | 4.34E-21 |
| BCl | 1.77E-21 | 5.92E-22 | 5.92E-22 |
| TiCl | 9.42E-39 | 3.14E-39 | 3.14E-39 |
| B | 6.40E-43 | 2.13E-43 | 2.13E-43 |
| Ti | 4.94E-54 | 1.65E-54 | 1.65E-54 |
| B2 | 1.47E-71 | 4.90E-72 | 4.90E-72 |
| TOTAL: | 3.00E+00 | 1.00E+00 | 1.00E+00 |
| | | | |
| | mol | | ACTIVITY |
| TiCl4_solid(s) | T 0.0000E+00 | | 8.73E-05 |
| TiCl3_solid(s) | 0.00E+00 | | 4.54E-05 |
| TiCl2_solid(s) | 0.00E+00 | | 5.28E-12 |
| B_solid_beta-rhomboh(s) | 0.00E+00 | | 2.38E-13 |
| Ti_solid_alpha(s) | 0.00E+00 | | 3.01E-30 |
| Ti_solid_beta(s2) | 0.00E+00 | | 2.30E-30 |
| TiB_solid(s) | 0.00E+00 | | 3.44E-32 |
| TiB2_solid(s) | 0.00E+00 | | 2.10E-37 |

FIG.5

| T = 1000.00 °C | | | |
|---|---|---|---|
| P = 1.00000E+00 atm | | | |
| V = 3.13452E+02 dm3 | | | |
| | | | |
| STREAM CONSTITUENTS | AMOUNT/mol | TEMPERATURE/°C | PRESSURE/atm |
| TiB2_solid(s) | 1.00E+00 | 1000 | 1.00E+00 |
| Cl2/gas_Ideal/ | 5.00E+00 | 1000 | 1.00E+00 |
| | | | |
| | EQUIL AMOUNT | MOLE FRACTION | FUGACITY |
| PHASE: gas_Ideal | mol | | atm |
| BCl3 | 2.00E+00 | 6.67E-01 | 6.67E-01 |
| TiCl4 | 1.00E+00 | 3.33E-01 | 3.33E-01 |
| TiCl3 | 4.84E-04 | 1.61E-0.4 | 1.61E-0.4 |
| Cl | 2.00E-08 | 6.66E-05 | 6.66E-05 |
| Cl2 | 1.42E-04 | 4.75E-05 | 4.75E-05 |
| BCl2 | 1.15E-06 | 3.82E-07 | 3.82E-07 |
| (BCl2)2 | 4.29E-09 | 1.43E-09 | 1.43E-09 |
| Ti2Cl6 | 1.35E-09 | 4.49E-10 | 4.49E-10 |
| TiCl2 | 1.49E-10 | 4.96E-11 | 4.96E-11 |
| BCl | 7.34E-11 | 2.45E-11 | 2.45E-11 |
| TiCl | 3.35E-20 | 1.12E-20 | 1.12E-20 |
| B | 5.18E-23 | 1.71E-23 | 1.71E-23 |
| Ti | 6.26E-29 | 2.09E-29 | 2.09E-29 |
| B2 | 1.63E-39 | 5.43E-40 | 5.43E-40 |
| TOTAL: | 3.00E+00 | 1.00E+00 | 1.00E+00 |
| | | | |
| | mol | | ACTIVITY |
| TiCl3_solid(s) | 0.00E+00 | | 1.49E-05 |
| TiCl4_solid(s) | T 0.0000E+00 | | 6.39E-06 |
| B_solid_beta-rhomboh(s) | 0.00E+00 | | 2.61E-08 |
| TiCl2_solid(s) | 0.00E+00 | | 5.37E-09 |
| Ti_solid_beta(s2) | 0.00E+00 | | 1.42E-17 |
| Ti_solid_alpha(s) | 0.00E+00 | | 1.37E-17 |
| TiB_solid(s) | 0.00E+00 | | 8.71E-19 |
| TiB2_solid(s) | 0.00E+00 | | 3.75E-22 |

RECYCLE OF TITANIUM DIBORIDE MATERIALS

CROSS-REFERENCE TO RELATED APPLICATIONS

This application is a continuation of U.S. application Ser. No. 13/910,679 filed Jun. 5, 2013, which claims priority to U.S. Provisional Application No. 61/656,357, filed on Jun. 6, 2012, U.S. Provisional Application No. 61/698,897, filed on Sep. 10, 2012, and U.S. Provisional Application No. 61/787,127, filed on Mar. 15, 2013. The disclosure of U.S. application Ser. No. 13/910,679 and U.S. Provisional Applications Nos. 61/656,357, 61/698,897, and 61/787,127 are hereby incorporated by reference in their entirety for all purposes.

U.S. GOVERNMENT RIGHTS

N/A

COPYRIGHT NOTIFICATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND OF THE INVENTION

1. Field of the Invention

The present invention relates to the recycling of spent or used titanium boride ("TiB2") articles, including contaminated TiB2 articles. More specifically, the present invention relates to the recycling of TiB2 articles by chlorinating the TiB2 articles, purifying and reacting the same to produce new TiB2 articles. In some embodiments, the titanium diboride articles are 100% of the TiB2 feedstock for the recycling process. In some embodiments, the titanium diboride articles are a percentage of the TiB2 feedstock for the recycling process.

In some embodiments, TiB2 feedstock is chlorinated to recycle spent TiB2 articles. In some embodiments, the TiB2 articles (e.g. including additives and/or impurities) can be chlorinated and processed into one or more forms (TiO2, BCl2, TiB2, etc.). In some embodiments, a titanium feedstock includes titanium diboride articles and titanium ores and/or slags that are processed to form TiO2 (e.g. pigment grade TiO2). In some embodiments, the titanium diboride articles can be combined with a titanium feedstock (e.g. titanium ore and/or titanium slag) at a certain weight percentage to produce TiO2 and/or produce one or more products from a chlorinating process.

SUMMARY OF THE INVENTION

The present invention relates to a TiB2 recycle method, and in particular, to a method of recycling a TiB2 feedstock by chlorination.

Additional goals and advantages of the present invention will become more evident in the description of the figures, the detailed description of the invention, and the claims.

The foregoing and/or other aspects and utilities of the present invention may be achieved by providing a method to produce a titanium product, including preparing a TiB2 feedstock; and chlorinating the prepared TiB2 feedstock to produce a titanium chloride product.

In another embodiment, the TiB2 feedstock includes TiB2 articles, and the preparing of the TiB2 feedstock includes crushing the TiB2 articles to a predetermined average TiB2 particle size or TiB2 particle size distribution.

In another embodiment, the TiB2 articles include at least one of TiB2 armor products, TiB2 tool products, TiB2 coatings, TiB2 electrodes, and TiB2 powders.

In another embodiment, the TiB2 feedstock consists essentially of crushed TiB2 articles.

In another embodiment, the crushed TiB2 articles include at least one of sodium and fluorine residues.

In another embodiment, the crushed TiB2 articles include no more than 2% sodium and fluorine residues.

In another embodiment, the preparing of the TiB2 feedstock further includes combining the TiB2 articles with at least one of Ti-containing ores and Ti-slag.

In another embodiment, the preparing of the TiB2 feedstock further includes crushing the combination of TiB2 articles with at least one of Ti-containing ores and Ti-slag to a predetermined average particle size or particle size distribution to prepare the TiB2 feedstock.

In another embodiment, the Ti-containing ore includes ilmenite.

In another embodiment, the Ti-containing ore has a TiO2 content of at least 80% by weight.

In another embodiment, the Ti-slag includes smelting products of ilmenite ore processed to lower the iron content thereof.

In another embodiment, the Ti-slag has a TiO2 content of at least 85%.

In another embodiment, the TiB2 feedstock includes no more than 10% TiB2 articles.

In another embodiment, the TiB2 feedstock includes impurities.

In another embodiment, the impurities include at least one of Fe, Ni, Co, W, NA, F, Al, Li, Mg, Ca, Cl, halide salts, borates, and combinations thereof.

In another embodiment, the impurities include residual salts, residual electrolytic bath, sodium-containing materials, calcium-containing materials, and fluoride containing materials.

In another embodiment, the chlorinating of the prepared TiB2 feedstock includes chlorinating the prepared TiB2 feedstock with chlorine gas and coke under a reducing atmosphere.

In another embodiment, the chlorinating of the prepared TiB2 feedstock includes chlorinating the prepared TiB2 feedstock with chlorine gas and coke at above 700° C.

In another embodiment, the chlorinating of the prepared TiB2 feedstock includes chlorinating the prepared TiB2 feedstock with chlorine gas and coke at less than 900° C.

In another embodiment, the chlorinating of the prepared TiB2 feedstock includes chlorinating the prepared TiB2 feedstock through a fluidized bed chlorinator at between 900° C. and 1000° C.

In another embodiment, the chlorinating of the prepared TiB2 feedstock includes chlorinating the prepared TiB2 feedstock with chlorine gas and coke at less than 900° C.

In another embodiment, the chlorinating of the prepared TiB2 feedstock includes chlorinating the prepared TiB2 feedstock with chlorine gas and coke at less than 800° C.

In another embodiment, the chlorinating of the prepared TiB2 feedstock includes chlorinating the prepared TiB2 feedstock with chlorine gas and coke at less than 700° C.

In another embodiment, the chlorinating of the prepared TiB2 feedstock produces a titanium chloride product and a boron chloride product.

In another embodiment, the prepared TiB2 feedstock is consumed through chlorination and substantially transformed into titanium chloride vapor.

In another embodiment, the method further includes purifying the chlorinated TiB2 feedstock to remove by-products.

In another embodiment, the purifying of the chlorinated TiB2 feedstock includes separating low, medium, and high boiling chlorides via fractional distillation.

In another embodiment, the purifying of the chlorinated TiB2 feedstock further includes separation of non-chloride compounds or slag.

In another embodiment, the method further includes reacting the titanium chloride product to produce a TiB2 product.

In another embodiment, the reacting the titanium chloride product includes: oxidizing the titanium chloride product to produce a titanium oxide product; and reacting the titanium oxide product via a carbothermic reaction to produce the TiB2 product.

In another embodiment, the reacting of the titanium oxide product via a carbothermic reaction to produce the TiB2 product includes adding a boron oxide product to the carbothermic reaction.

In another embodiment, the oxidizing of the titanium chloride product includes adding additional titanium chloride to the prepared TiB2 feedstock during the chlorinating to produce the titanium chloride product.

In another embodiment, the method further includes recovering chlorine from the oxidizing of the titanium chloride product, and directing the recovered chlorine for use during the chlorinating of the prepared TiB2 feedstock to produce the titanium chloride product.

In another embodiment, the reacting of the titanium chloride product includes: reducing the titanium chloride product with H2 gas to produce the TiB2 product.

In another embodiment, the method further includes reacting the titanium chloride product and the boron chloride product to produce a TiB2 product.

In another embodiment, the reacting the titanium chloride product includes: oxidizing the titanium chloride product and the boron chloride product to produce a titanium oxide product and a boron oxide product; and reacting the titanium oxide product and the boron oxide product via a carbothermic reaction to produce the TiB2 product.

In another embodiment, no significant amount of titanium chloride product or boron chloride product is added.

In another embodiment, the reacting of the titanium oxide product via a carbothermic reaction to produce the TiB2 product does not require adding a boron oxide product to the carbothermic reaction.

In another embodiment, the reacting of the titanium chloride product includes: reducing the titanium chloride product and the boron chloride product with H2 gas to produce the TiB2 product.

In another embodiment, no significant amount of titanium chloride product or boron chloride product is added.

BRIEF DESCRIPTION OF THE DRAWINGS

These and/or other aspects and advantages of the present invention will become apparent and more readily appreciated from the following description of the various embodiments, taken in conjunction with the accompanying drawings of which.

DETAILED DESCRIPTION OF THE EMBODIMENTS

Reference will now be made in detail to the various embodiments of the present invention. The embodiments are described below to provide a more complete understanding of the components, processes and apparatuses of the present invention. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments of the present invention may be readily combined, without departing from the scope or spirit of the present invention.

When referring to any numerical range of values herein, such ranges are understood to include each and every number and/or fraction between the stated range minimum and maximum. For example, a range of about 0.5-6% would expressly include all intermediate values of about 0.6%, 0.7%, and 0.9%, all the way up to and including 5.95%, 5.97%, and 5.99%. The same applies to each other numerical property and/or elemental range set forth herein, unless the context clearly dictates otherwise.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "chlorinating" refers to chemically treating a material with chlorine. For example, in one embodiment, a TiB2 feedstock is chlorinated using chlorine gas and coke to form various chloride products. In one embodiment, the chlorination reaction is exothermic and in another embodiment, the chlorination reaction is carried out at approximately 900° C. in a reducing atmosphere.

As used herein, the term "crushing" refers to physically pressing, deforming, or squeezing a material into smaller fragments. In one embodiment, a material is crushed to increase its surface area. For example, a material may be crushed via hammer milling, jaw crushing, wet milling, ball milling (e.g. ultrafine ball milling) and the like.

As used herein, the term "crystallite size" refers to the average size of a crystal of material in crystalline form.

As used herein, the term "grinding" refers to physically reducing a material to smaller particles, for example by pounding, crushing, or milling.

As used herein, the term "impurities" refers to contaminants present in a material. For example, in some embodiments, a TiB2 article may include impurities based on a fabrication method or use of the TiB2 article, including residual salts (e.g. chloride salts); impurities of metal-production (e.g. aluminum smelting); residual electrolyte bath (e.g. constituents including but not limited to: Al, Li, Na, K, halide salts, Mg, Ca, and combinations thereof); aluminum-containing materials (e.g. Al, Al2O3, AlCl3); sodium-containing materials (e.g. NaCl); and calcium-containing materials (e.g. CaCl2), to name a few. In some embodiments, impurities present in the titanium diboride material or article may also include residual fluoride salts and/or fluoride-containing material (e.g. CaF2, NaF, and AlF3).

As used herein, the term "particle size" refers to an average particle size of a material.

As used herein, the term "purifying" refers to removing contaminants and/or impurities from a material. In some embodiments, purifying comprises a distilling step, such as a process of vaporization and subsequent condensation. For example, in some embodiments of the present invention, the boiling points of boron chloride products and titanium chloride products are used to separate them from contaminants and/or impurities during a chlorination operation.

As used herein, "reacting" refers to chemically reacting components or materials to form another component or material. For example, in one embodiment, a titanium chloride product is reacted with a boron chloride product to produce titanium diboride.

As used herein, the term "reducing" refers to a process in which electrons are added to an atom or ion (e.g. as by removing oxygen or adding hydrogen). For example, in some embodiments, reducing includes performing a gas phase reduction (e.g. with H2 gas). In other embodiments, reducing comprises the feeding of mixed chlorides products with hydrogen gas through a plasma phase torch for a reducing reaction.

As used herein, the term "surface area" refers to an average surface area of a material.

As used herein, "titanium feed material" or "TiB2 feedstock" refers to a titanium-containing material which is used as feed in a process. For example, in some embodiments, the TiB2 feedstock may include TiB2; crushed TiB2 articles with additives and/or impurities; and/or a blended material having TiB2, Ti-Ores, and/or Ti-slag.

As used herein, "TiB2 material" or "TiB2 article" refers to titanium diboride source material, which includes a material having titanium diboride therein. In some embodiments the titanium diboride material includes additives and/or impurities. Some non-limiting examples of additives and/or impurities in the titanium diboride product include: Fe, Ni, Co, W, Na, F, Al, Li, Mg, Ca, Cl, halide salts, borates, and combinations thereof. Some non-limiting examples of a titanium diboride material or article include: armor, cutting tools, crucibles, wear resistant coatings, evaporation boats, electrodes, powders, and any other articles used in various mechanical and/or electrical applications for titanium diboride materials.

Figure 1:
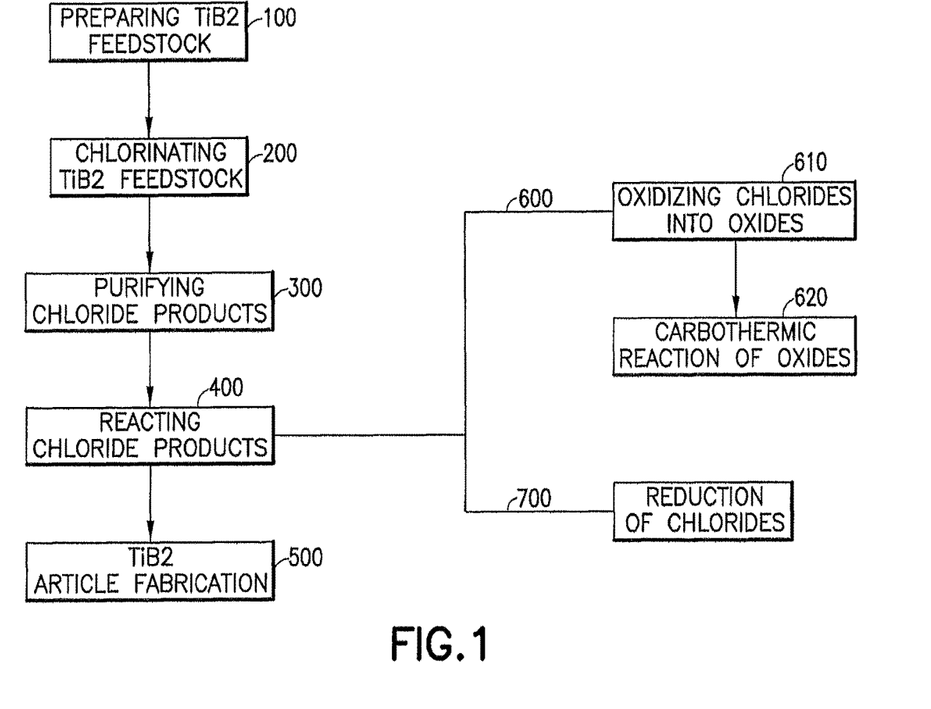
FIG. 1 illustrates a TiB2 recycling method according to an embodiment of the present invention.

FIG. 1 illustrates a TiB2 recycling method according to an embodiment of the present invention. As illustrated in FIG. 1, a method for TiB2 recycling includes preparing the TiB2 feedstock (100); chlorinating the TiB2 feedstock (200); purifying the chloride products (300); reacting the chloride products (400); and fabricating TiB2 articles (500).

In one embodiment of the present invention, preparing the TiB2 feedstock in operation (100) includes crushing or grinding the TiB2 articles to a desired average particle size or surface area. For example, the TiB2 feedstock may be crushed to an average particle size between 5 microns and 40 mm, or no more than 0.6 mm. In another embodiment, the average particle size of the TiB2 feedstock is small enough so that there is adequate surface area for surface reactions/dissolution to occur (e.g. consumption rate). In some embodiments, the average particle size is at least about 5 microns; at least about 10 microns: at least about 50 microns; at least about 100 microns; at least about 500 microns; at least about 1 mm; at least about 2 mm; at least about 3 mm; at least about 5 mm; at least about 10 mm; at least about 15 mm; at least about 20 mm; at least about 30 mm; or at least about 40 mm.

In other embodiments, the average particle size of the titanium diboride material (for the chlorinating step) is: not greater than about 5 microns; not greater than about 10 microns: not greater than about 50 microns; not greater than about 100 microns; not greater than about 500 microns; not greater than about 1 mm; not greater than about 2 mm; not greater than about 3 mm; not greater than about 5 mm; not greater than about 10 mm; not greater than about 15 mm; not greater than about 20 mm; not greater than about 30 mm; or not greater than about 40 mm.

In some embodiments, the TiB2 articles are prepared prior to chlorinating. In other embodiments, the TiB2 articles are prepared separately from the Ti-Ore and/or slag, and combined after being crushed or grinded. In another example, the TiB2 articles are combined with the Ti-Ore and/or Ti-Slag and then grinded to a predetermined average particle size. In one embodiment, the average particle size for the TiB2 feedstock is between 100-500 microns. In another embodiment, the TiB2 feedstock has a d50 average particle size. In yet another embodiment, the TiB2 feedstock has a maximum particle size of 100 microns or no more than 100 microns.

In one embodiment, the TiB2 feedstock is composed of crushed TiB2 articles. In another embodiment, the TiB2 feedstock includes crushed TiB2 articles and Ti-ore and/or Ti-slag. For example, the TiB2 feedstock may include a combination of TiB2 articles and ilmenite slag (e.g. 50.9 wt. % Ti); synthetic rutile (e.g. 55.2 wt. % Ti); natural rutile (e.g. 56.9 wt. % Ti); titania slag; and combinations thereof. In one embodiment, the TiB2 feedstock includes between 1%-10% TiB2 articles based on a total weight of the TiB2 feedstock. In some embodiments, the TiB2 feedstock includes: not greater than about 25 wt. % TiB2 articles; not greater than about 20 wt. % TiB2 articles; not greater than about 15 wt. % TiB2 articles; not greater than about 10 wt. % TiB2 articles; or not greater than about 5 wt. % TiB2 articles. In other embodiments, the TiB2 feedstock includes: not greater than 5 wt. % TiB2 articles; not greater than about 4 wt. % TiB2 articles; not greater than about 3 wt. % TiB2 articles; not greater than about 2 wt. % TiB2 articles; not greater than about 1 wt. % TiB2 articles; or not greater than about 0.5 wt. % TiB2 articles.

In some embodiments, the TiB2 feedstock includes: at least about 25 wt. % TiB2 articles; at least about 20 wt. % TiB2 articles; at least about 15 wt. % TiB2 articles; at least about 10 wt. % TiB2 articles; or at feast about 5 wt. % TiB2 articles. In some embodiments, the blend includes: at least about 5 wt. % TiB2 articles; at least about 4 wt. % TiB2 articles; at least about 3 wt. % TiB2 articles; at least about 2 wt. % TiB2 articles; at least about 1 wt. % TiB2 articles; or at least about 0.5 wt. % TiB2 articles.

In one embodiment of the present invention, chlorinating the TiB2 feedstock in operation (200) includes exposing the TiB2 feedstock to a chlorine gas to produce chloride products. For example, in one embodiment, the TiB2 feedstock includes TiB2 articles and Ti-ores having a high percentage of TiO2 (e.g. ilmenite slag is approximately 85% TiO2; synthetic rutile is approximately 92% TiO2; and natural rutile is approximately 95% TiO2). In that embodiment, the production of Titanium chloride products may proceed by the following reactions:

$$2C + O_2 = 2CO \quad \text{(eq. 1)}$$

$$TiO_2 + 2Cl_2 + 2CO = TiCl_4 + 2CO_2 \quad \text{(eq. 2)}$$

$$TiO_2 + 2Cl_2 + C = TiCl_4 + CO_2 \quad \text{(eq. 3)}$$

$$TiB_2 + 5Cl_2 = TiCl_4 + 2BCl_3 \quad \text{(eq. 4)}$$

As presented in the equations above, in one embodiment, the TiB2 feedstock is treated with chlorine gas to form titanium chlorides and boron (boric) chlorides. In some embodiments, the chlorinating comprises reacting the TiB2 feedstock in the presence of chlorine gas (e.g. Cl2). In some embodiments, chlorinated solvents and/or salts may be used for the chlorinating operation 200. In one non-limiting embodiment, the chlorination operation 200 is completed in a fluidized bed chlorinator at a temperature in the range of about 900° C. to 1000° C. In another embodiment, the solid TiB2 feedstock is completely consumed through chlorination and transformed into vapor (e.g. titanium chloride) during chlorinating operation 200.

In some embodiments, the chlorinating is performed at a temperature of: not greater than about room temperature, not greater than about 50° C., not greater than about 100° C., not greater than about 150° C., not greater than about 200° C., not greater than about 250° C., not greater than about 300° C., not greater than about 400° C., not greater than about 500° C., not greater than about 600° C., not greater than about 700° C., not greater than about 800° C., not greater than about 900° C., not greater than about 1000° C., not greater than about 1200° C., or not greater than about 1500° C.

In some embodiments, the chlorinating is performed at a temperature of: at least about room temperature, at least about 50° C., at least about 100° C., at least about 150° C., at least about 200° C., at least about 250° C., at least about 300° C., at least about 400° C., at least about 500° C., at least about 600° C., at least about 700° C., at least about 800° C., at least about 900° C., at least about 1000° C., at least about 1200° C., or at least about 1500° C.

As illustrated in equations 1-3 above, when the TiB2 feedstock includes Ti-ore and/or Ti-slag, in some embodiments carbon needs to be added to the chlorination reaction. In another embodiment, when the TiB2 feedstock comprises mostly TiB2 articles, the reaction follows equation 4, and it is not necessary to add carbon to the chlorination reaction. In some embodiments, the TiB2 feedstock consists essentially of TiB2 articles, and the chlorination of the TiB2 feedstock is completed in the absence of carbon.

In one embodiment of the present invention, the chlorination of the TiB2 feedstock produces titanium chloride products, such as TiCl$_4$. In another embodiment, the chlorination of the TiB2 feedstock produces titanium chloride and boron chloride products, such as TiCl$_4$ and BCl$_3$.

In one embodiment of the invention, the TiB2 articles are recycled into titanium dioxide (titania). In that embodiment, the titanium chloride products of operation 200 are reacted with oxygen according to the following reaction.

$$TiCl_4 + O_2 = TiO_2 + 2Cl_2 \quad \text{(eq. 5)}$$

After chlorinating the TiB2 feedstock, the chloride products of operation (200) can be purified in operation (300).

For example, in one embodiment, after the chlorination, volatile species are separated from the desired chloride products by fractional distillation into low, medium, and high boiling chlorides.

In another embodiment, non-chlorinating residues may be removed in operation (300). For example, in one embodiment fluorides compounds may vaporize and report to condensed phases in operation (300).

According to embodiments of the present invention, the purifying operation (300) separates the titanium chloride products and/or boron chloride products from the rest of the chloride materials and impurities and contaminates. For example, in some embodiments, the purifying operation (300) removes impurities from the chloride products (e.g. the desired titanium chloride and/or Boron chloride products) in the amount of: at least about 0.01 wt. %; at least about 0.05 wt. %; at least about 0.1 wt. %; at least about 0.2 wt. %; at least about 0.5 wt. %; at least about 1 wt. %; at least about 2 wt. %; at least about 5 wt. %; at least about 7 wt. %; at least about 10 wt. %; at least about 15 wt. %; or greater.

In other embodiments, the purifying operation (300) removes impurities from the desired chloride products in the amount of: not greater than about 0.01 wt. %; not greater than about 0.05 wt. %; not greater than about 0.1 wt. %; not greater than about 0.2 wt. %; not greater than about 0.5 wt. %; not greater than about 1 wt. %; not greater than about 2 wt. %; not greater than about 5 wt. %; not greater than about 7 wt. %; not greater than about 10 wt. %; not greater than about 15 wt. %; or greater.

In one embodiment of the invention, the purified titanium chloride products of operation (300) are further reacted to produce a new TiB2 product in operation (400).

For example, as illustrated in FIG. 1, the titanium chloride products and the boron chloride products can be oxidized and carbothermically reacted in operation (600) to produce a TiB2 product. In one embodiment, operation (600) includes oxidizing the titanium chloride and boron chloride product to form a titanium dioxide and a boric oxide (e.g. boric acid) product in operation (610), followed by carbothermically reacting the titanium dioxide and boric oxide to form a TiB2 product in operation (620).

In another embodiment, a TiB2 product can be produced by the hydrogen reduction of boron halides in the presence of the metal or its halides in operation (700).

In yet another embodiment, a TiB2 product can be produced by the direct reaction(s) of titanium (or its oxides/hydrides) with elemental boron at temperatures at or exceeding 1000° C.

After a new TiB2 product is obtained in operation (400), the TiB2 product is processed into a new TiB2 article in operation (500). For example, the TiB2 product can be made into a TiB2 powder via spray drying, or sintered into a TiB2 armor plate.

Figure 2:
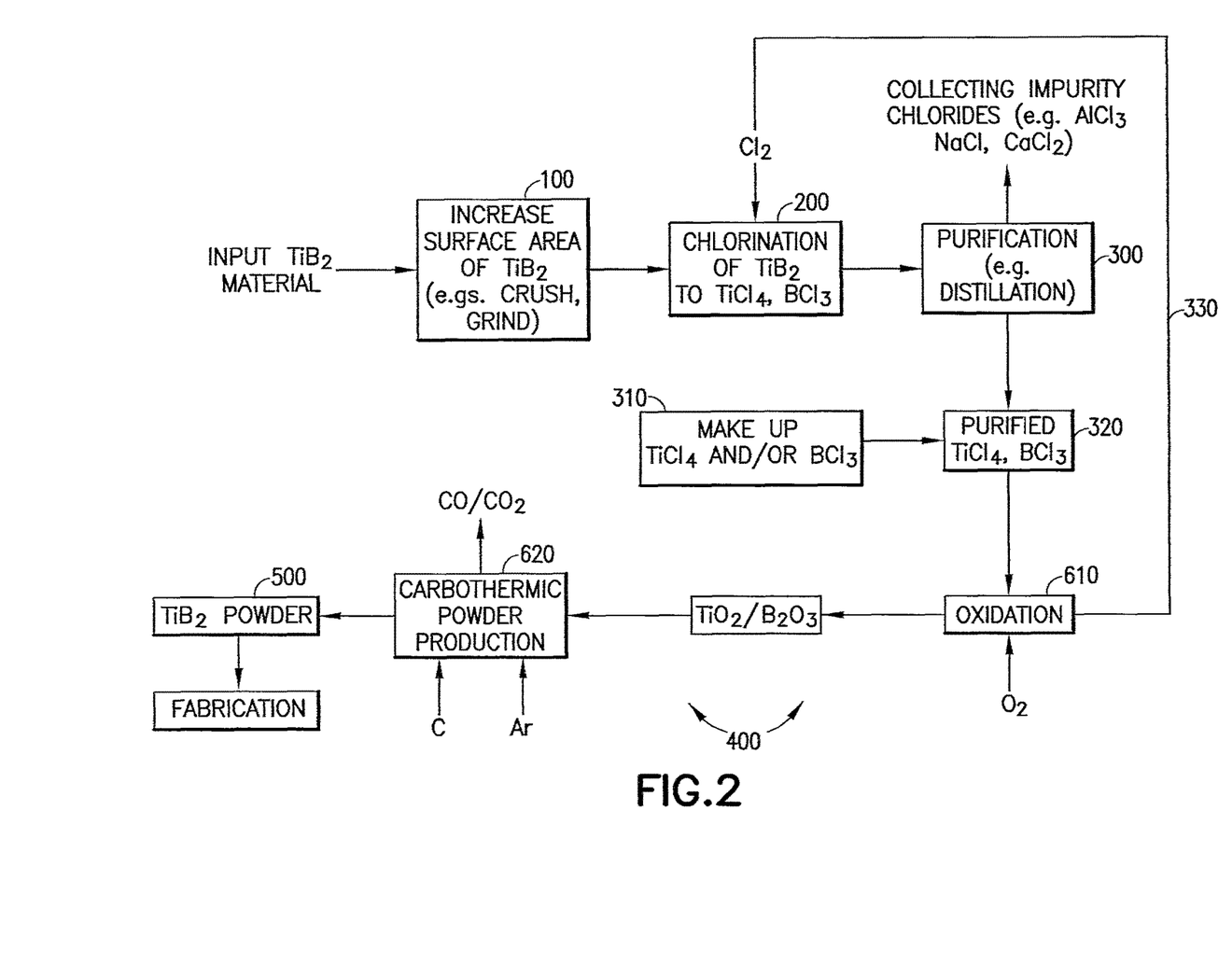
FIG. 2 illustrates a TiB2 recycling method according to an embodiment of the present invention.
Figure 3:
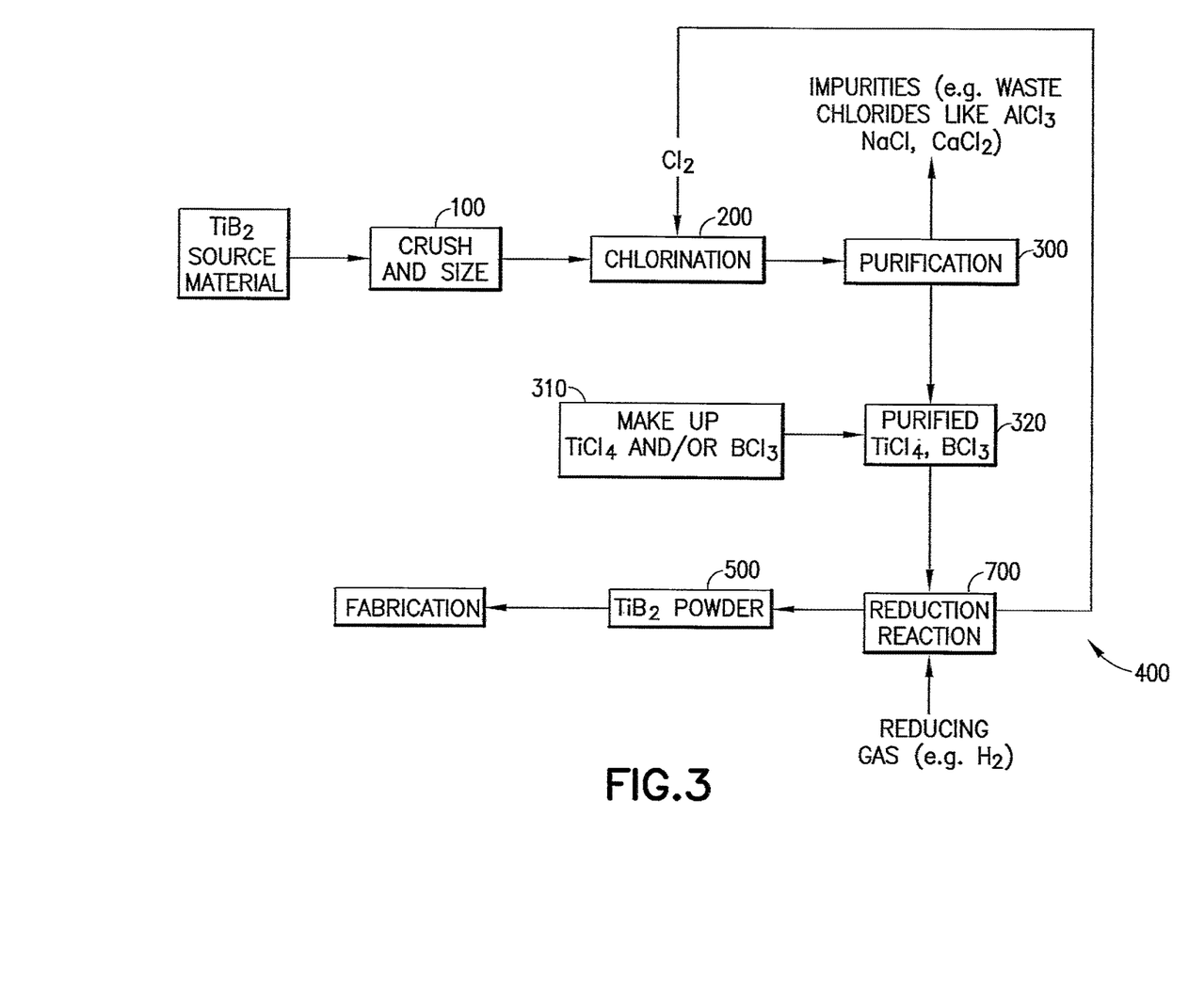
FIG. 3 illustrates a TiB2 recycling method according to an embodiment of the present invention.

FIGS. 2 and 3 illustrate TiB2 recycling methods according to embodiments of the present invention.

As illustrated in FIG. 2, a TiB2 recycling method includes increasing the surface area of an input TiB2 material (100); chlorinating the TiB2 material to produce chloride products including TiCl4 and BCl3 (200); purifying the chloride products (300) and reacting the purified TiCl4 and BCl3 (400) to produce a TiB2 powder (500).

In one embodiment of the invention, impurities in the TiB2 feedstock react with the chlorine gas in chlorination operation (200) to produce impurity chlorides, and the impurity chlorides are collected and removed via fractional distillation in purifying operation (300).

In one embodiment of the invention, the TiB2 feedstock includes Ti-ores and/or slag. In that embodiment, additional TiCl4 and/or BCl3 is added to the purified TiCl4 and/or BCl3 streams in operation (310). The purified TiCl4 and/or BCl3 with the additional TiCl4 and/or BCl3 is then further processed in operations (610) and (620) to produce a TiB2 powder.

Figure 4:
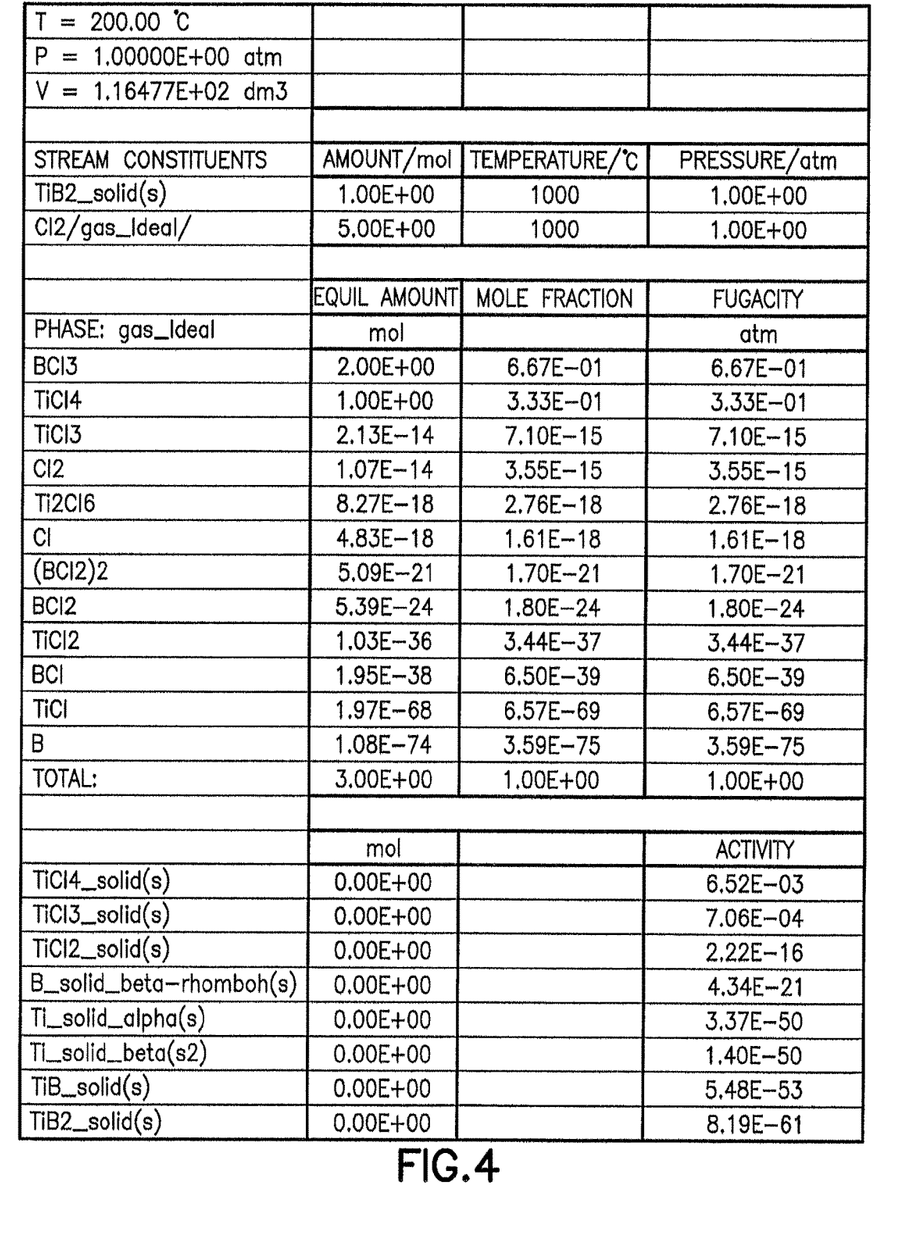
FIG. 4 illustrates a thermodynamic model for the chlorination of a TiB2 feedstock at 200° C.
Figure 5:
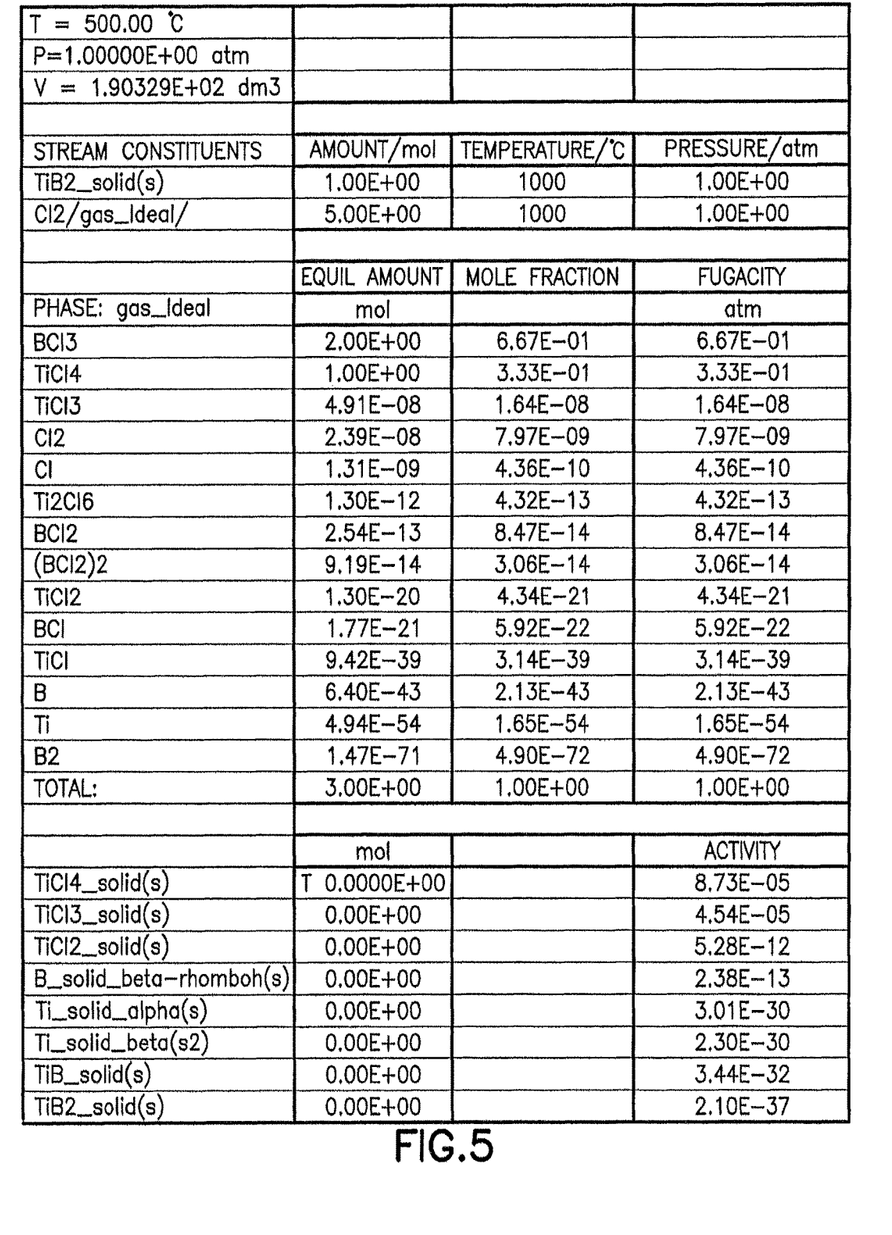
FIG. 5 illustrates a thermodynamic model for the chlorination of a TiB2 feedstock at 500° C.
Figure 6:
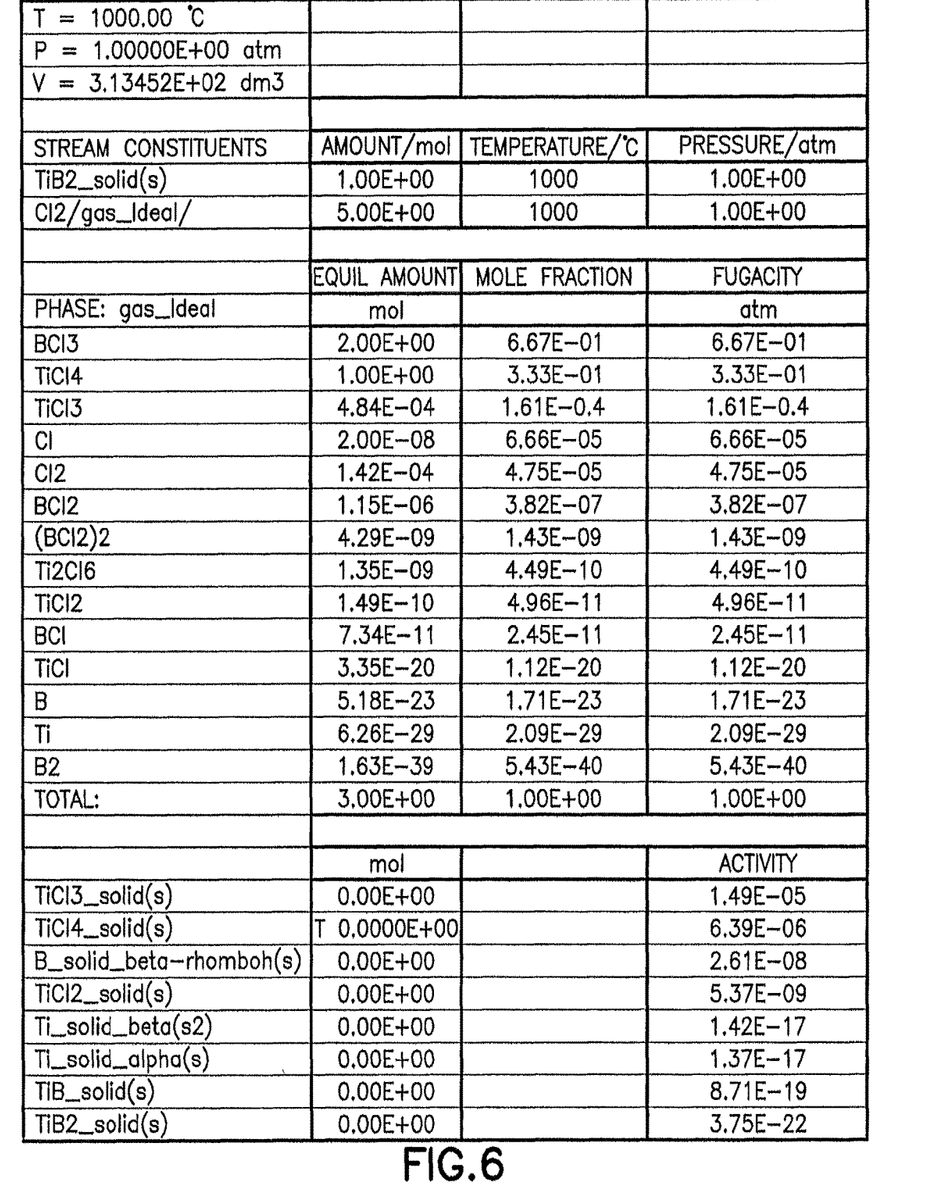
FIG. 6 illustrates a thermodynamic model for the chlorination of a TiB2 feedstock at 1000° C.

In another embodiment, when the TiB2 feedstock includes substantially mostly TiB2 articles, the reaction operation (400) can be performed without the need for additional TiCl4 and/or BCl3. For example, FIGS. 4-6 illustrate models for the chlorination of TiB2 feedstocks consisting only of TiB2. As illustrated in FIGS. 4-6, the chlorination of the TiB2 feedstock produces amounts of TiCl4 and BCl3 sufficient for the production of TiB2 products after purification operation (300) and reaction operation (400) and reaction without the need for significant amounts of additional TiCl4 and/or BCl3.

In one embodiment, depending on the purified recovery of TiCl4 and/or BCl3 from the TiB2 Feedstock after purification operation (300), the reaction operation (400) can progress without the need for significant amounts of additional TiCl4 and/or BCl3. In another embodiment, the ration of titanium chloride compounds and boron chloride compounds is appropriate after the purification operation (300) for the production of new TiB2 products.

As illustrated in FIG. 2, the purified TiCl4 and/or BCl3 is reacted in operation (400) to produce a TiB2 powder. In one embodiment, the purified TiCl4 and/or BCl3 is subject to an oxidation reaction in operation (610) to produce a titanium oxide and a boron oxide product; and the titanium oxide and a boron oxide product are carbothermically reacted in operation (620) to produce a TiB2 powder.

In some embodiments, the chlorine from the oxidation operation (610) is recycled (330) into the chlorinator (200), while the resulting titanium dioxide is further processed in operation (620).

As illustrated in FIG. 3, a TiB2 recycling method includes increasing the surface area of an input TiB2 source material (100); chlorinating the TiB2 source material to produce chloride products including TiCl4 and BCl3 (200); purifying the chloride products (300) and reacting the purified TiCl4 and BCl3 (400) to produce a TiB2 powder (500).

In one embodiment of the invention, impurities in the TiB2 source material produce impurity chlorides in the chlorination operation (200), and the impurity chlorides are collected and removed in purifying operation (300).

Additional TiCl4 and/or BCl3 is added to the purified TiCl4 and/or BCl3 streams in operation (310) as needed. The purified TiCl4 and/or BCl3 is then reacted in operation (700)) to produce a TiB2 powder.

In one embodiment, the purified TiCl4 and/or BCl3 is subject to a reduction operation (700) to produce a TiB2 powder (500).

In some embodiments, the chlorine from the reduction reaction (700) is recycled (330) into the chlorinator (200).

Example 1: Cold Fluidization Test

Figure 7:
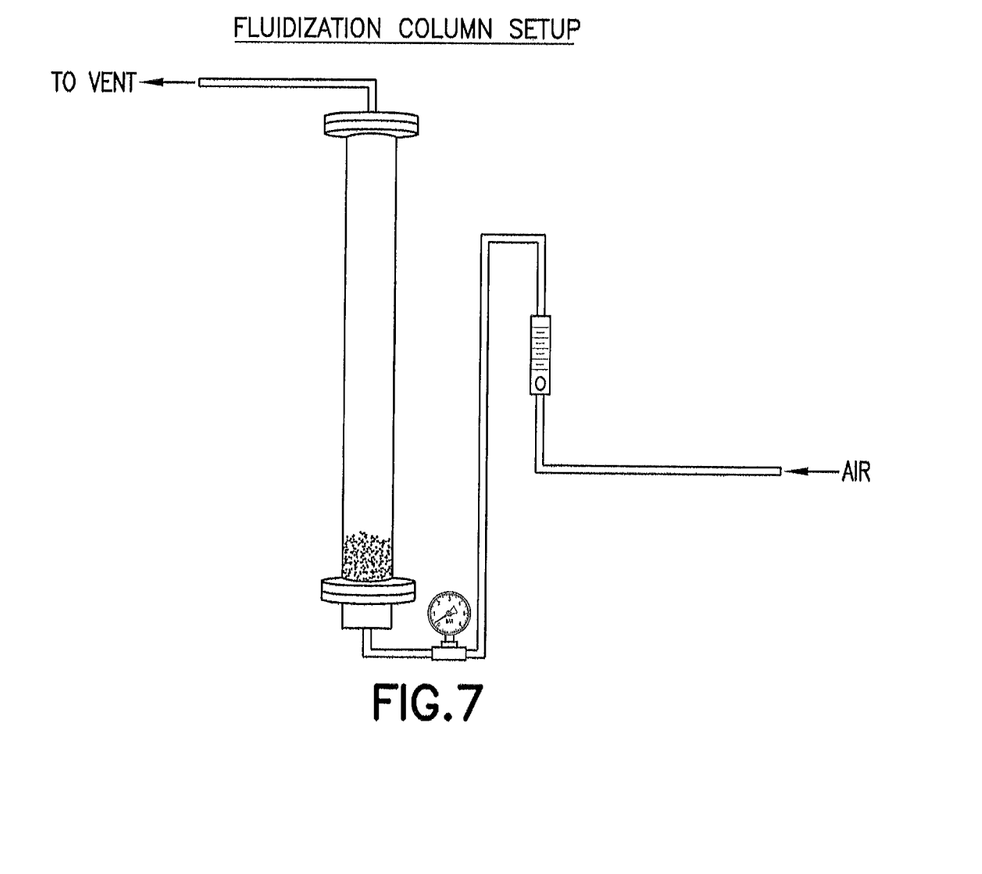
FIG. 7 illustrates a fluidization column according to an embodiment of the present invention.

Referring to FIG. 7, a cold fluidization test was performed on a TiB2 particulate material to determine whether the TiB2 particulate material could be utilized in a chlorinator. The fluidization column setup included a particle bed which was fluidized with increasing air volume until pressure drop across the bed was constant and fluidization of particles was verified via visual observation. The TiB2 fluidization tests confirmed that TiB2 in the size range of minus 30 mesh (e.g. <0.6 mm) was suitable for chlorination in the chlorinator.

Example 2: Chlorination Experiments

A TiB2 feedstock was chlorinated to assess its performance as a chlorinator feedstock for the production of TiCl4. The test was conducted in a batch fluidized bed chlorinator operated at between 1000° C. and 1200° C. The 1000° C. test determined the chlorination reaction rate while the 1200 C test determined the potential refractory material corrosion.

Figure 8:
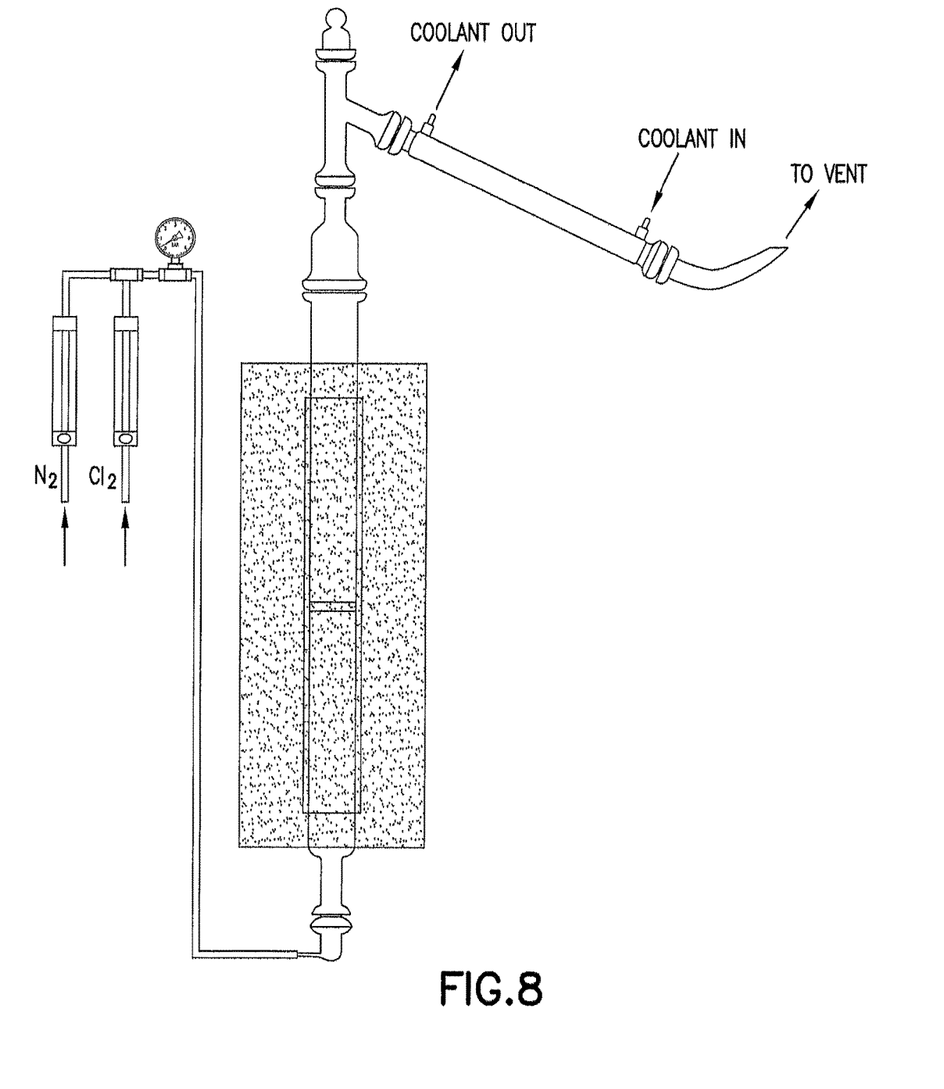
FIG. 8 illustrates a laboratory scale chlorination setup according to an embodiment of the present invention.

Referring to FIG. 8, the chlorinator used for example 2 was a 0.50 mm vertical quartz tube surrounded by a clamshell resistance heater unit. A porous quartz frit functioned as a bed support and gas diffuser. Fluidization gas (N2 or Cl2) was metered from gas cylinders, and the reactor off-gas was cooled in a series of glass condensers to recover the metal chloride reaction products. The test was run for two hours and the extent of reaction was determined by analysis of the residual bed material after cooling.

Test 1: Results with a TiB2 Feedstock of 100% TiB2 Articles

The chlorination test was conducted with 100% charge of crushed TiB2 articles and the chlorinator was charged with an amount similar to that used to chlorinate a feed material comprising 100% Ti-ores. No processing issues (bed sintering, condenser plugs, etc.) were observed during the chlorination test of the TiB2 feedstock. Based on the residual weight of the charge after two hours of reaction, the overall conversion rate was determined to be 0.3 g/min.

Test 2: Results with a TiB2 Feedstock of Blended TiB2 Articles and Ti-Ores

The chlorination was also completed on TiB2 feedstock blends of (1) 98/5 Ti-Ore:TiB2 by weight and 98/2 Ti-Ore:TiB2 by weight. In both experiment (1) and (2), the bed material did not adhere to the quartz tube sidewall or formed a sintered plug. Accordingly, Lab scale tests of a blended TiB2 feedstock showed the viability of TiB2 as a chlorinator feedstock for the production of TiCl4, and further processing into TiO2 and/or new TiB2 articles.

Unlike commercial scale chlorinators, lab scale chlorinators such as the one illustrated in FIG. 8 use quartz tube sidewalls. In test using high amounts of TiB2 articles for blended TiB2 feedstocks, such as (3) 50/50 Ti-Ore:TiB2 by weight or (2) 75/25 Ti-Ore:TiB2; adhesion of the bed material to the quartz tube sidewall and formation of a sintered plug was observed. However, the 25 w % TiB2 blend exhibited significantly less sintering. Without being bound to a particular mechanism or theory, one possible explanation is that the boron from TiB2 reacted with the metallic impurities in the standard ore (Na, Ca, etc.) and caused the formation of a low temperature borosilicate glassy phase which resulted in the clog. However, because commercial chlorinators use graphite (or other similar refractory materials) instead of quartz, the inventors do not expect similar results when processed at commercial scales.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A method to produce a titanium product, comprising:
preparing a TiB2 feedstock comprising TiB2 articles, wherein preparing the TiB2 feedstock comprises: crushing the TiB2 articles to a predetermined average TiB2 particle size or TiB2 particle size distribution, and combining the TiB2 articles with at least one of Ti-containing ores and Ti-slag; and
chlorinating the prepared TiB2 feedstock to produce a titanium chloride product.

2. The method of claim 1, wherein the TiB2 articles comprise at least one of TiB2 armor products, TiB2 tool products, TiB2 coatings, TiB2 electrodes, and TiB2 powders.

3. The method of claim 2 wherein the TiB2 feedstock consists essentially of crushed TiB2 articles.

4. The method of claim 3, wherein the crushed TiB2 articles comprise at least one of sodium and fluorine residues.

5. The method of claim 4, wherein the crushed TiB2 articles comprise no more than 2% sodium and fluorine residues.

6. The method of claim 2, wherein preparing of the TiB2 feedstock further comprises crushing the combination of TiB2 articles with at least one of Ti-containing ores and Ti-slag to a predetermined average particle size or particle size distribution to prepare the TiB2 feedstock.

7. The method of claim 6, wherein the Ti-containing ore comprises Ilmenite.

8. The method of claim 7, wherein the Ti-containing ore comprises a TiO2 content of at least 80% by weight.

9. The method of claim 8, wherein the Ti-slag comprises smelting products of ilmenite ore processed to lower the iron content thereof.

10. The method of claim 9, wherein the Ti-slag has a TiO2 content of at least 85%.

11. The method of claim 10, wherein the TiB2 feedstock comprises no more than 10% TiB2 articles.

12. The method of claim 11, wherein the TIB2 feedstock comprises impurities.

13. The method of claim 12, wherein the impurities comprise at least one of Fe, Ni, Co, W, Na, F, Al, Li, Mg, Ca, Cl, halide salts, borates, and combinations thereof.

14. The method of claim 13, wherein the impurities comprise residual salts, residual electrolytic bath, sodium-containing materials, calcium-containing materials, and fluoride containing materials.

15. The method of claim 14, wherein the chlorinating of the prepared TiB2 feedstock comprises chlorinating the prepared TiB2 feedstock through a fluidized bed chlorinator at between 900° C. and 1000° C.

* * * * *